Patented Feb. 13, 1945

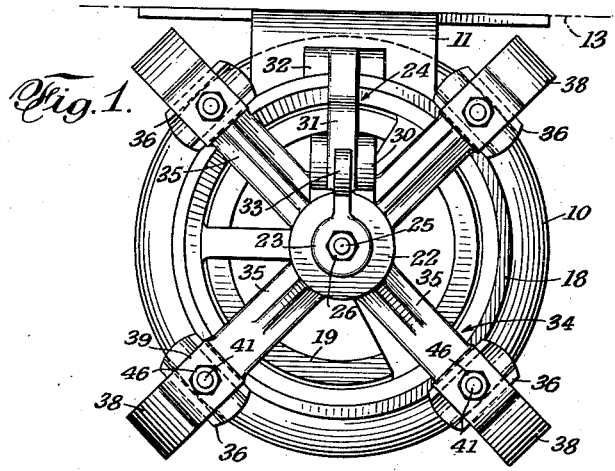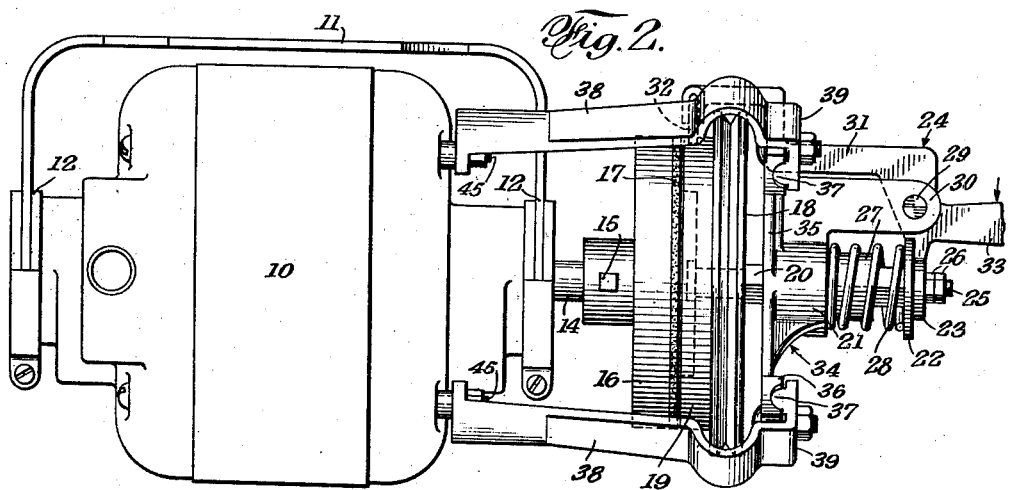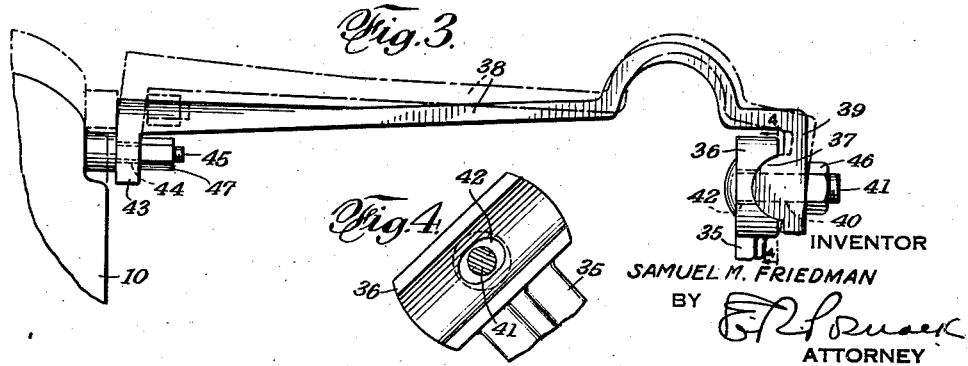

2,369,292

UNITED STATES PATENT OFFICE 2,369,292

TRANSMISSION MOUNTING

Samuel M. Friedman, Brooklyn, N. Y.

Application November 12, 1943, Serial No. 510,007

7 Claims. (Cl. 192—115)

This invention relates to transmission mountings, and particularly to adjustable mountings adapted for use in motor-transmission assemblies.

In many power driven units, such as in motor operated sewing machines, transmission mechanisms are employed in cooperative association with conventional motors, the arrangement generally being such as to permit intermittent transmission of power from the motor through the transmission mechanism to the device to be driven thereby. In most devices of this nature, the motor is suitably supported on a bracket which is either disposed upon or suspended from a floor or platform; and the transmission mechanism is generally supported by a mounting similarly disposed upon or suspended from the same floor or platform. Among the numerous known transmission mechanisms is the type having a clutch arrangement of two complementary members one carrying a drive plate with a friction surface thereon, and the other carrying a pulley member operatively connected to the driven device. To effect a proper coactive relationship between the motor and the two complementary portions of the clutch, it is obviously necessary that the clutch and motor shaft be in substantial axial alignment. This however is at times difficult to accomplish, inasmuch as the motors and the transmissions are generally not made by the same manufacturer—and yet they must be properly assembled. And it is also often necessary to employ a selected transmission mechanism with one or more of a variety of sizes of motors. To meet these conditions, various types of more or less complicated adjustable mountings have been employed. It is primarily within the contemplation of my invention to provide a relatively simple and easily adjusted mounting for motor transmission assemblies whereby a proper operative relationship can be quickly established between the complementary clutch elements of the transmission and various sized motors.

It is within the further contemplation of this invention to enable a transmission mounting of the category above referred-to to be conveniently suspended from or anchored to the housing of the motor, thereby permitting the transmission assembly to be conveniently and accurately adapted for coactive relationship with the motor. And in this aspect of my invention, it is a further object to employ the bolts or studs, used on conventional motors for securing together the housing sections thereon, as anchoring means upon which the transmission mounting can be secured.

It is another object of this invention to provide a transmission mounting of the above-mentioned type that can be readily adjusted for operative use with motors of different dimensions, and which is provided with structural members adapted to efficiently carry the load without impairing the axial alignment of the shafts.

Other objects, features and advantages will appear from the drawing and the description hereinafter given.

Referring to the drawing:

Figure 1 is an end elevation showing a motor-transmission assembly embodying my invention.

Figure 2 is a front view of the assembly of Figure 1.

Figure 3 is an enlarged fragmentary elevation of one of the adjustable supporting arms employed in the mounting of my invention, the dot-dash lines indicating an adjusted position of the arm with respect to a differently proportioned motor, and Figure 4 is a fragmentary section of Figure 3 substantially along line 4—4.

In the drawing, the electric motor 10 is suspended from the bracket 11 through the medium of hub clamps 12, the bracket being adapted for attachment to a suitable base or platform indicated by dot-dash line 13. The motor shaft 14 has fixedly attached thereto, through the medium of set screw 15, the driving plate 16 containing thereon the friction facing 17. The pulley member 18 contains the disc portion 19 in adjacent relation to the clutch facing 17, and normally spaced therefrom. The pulley member together with disc 19 are rotatably mounted upon the slide shaft 20 which, in the form illustrated, is substantially similar to the construction shown in Patent #2,187,968. This shaft, containing a portion of square cross section, is slideably mounted within bearing portion 21 of the mounting constituting a part of my invention. The right hand terminal portion of said shaft 20 (Figure 2) is in abutment with disc 22, and the terminal portion 23 of the lever 24, to be later described, is in abutting engagement with said disc 22. A threaded stud 25 extends into and is attached to the adjacent extremity of said shaft 20, substantially in the manner described in said Patent #2,187,968; and inasmuch as the particular construction thereof is not a necessary part of this invention, it is not described in detail herein. The nuts 26 are mounted over the said stud 25 and hold the said terminal portion of the lever against the disc 22.

Surmounted over the boss 27 of bearing portion 21 is the helical spring 28 bearing against disc 22 and normally urging the terminal portion 23 of the lever outwardly. In this manner, the said spring 28 serves to hold the clutch disc 19 normally disengaged from the facing 17 of clutch plate 16, in view of the cooperative action of nuts 26, stud 25 and shaft 20.

The said lever 24 is pivotally mounted at 29 on the support 30 fixedly associated with the bearing portion 21 of the mounting. The arm 31 of the lever carries at one terminal thereof the brake 32 normally engageable with the periphery of disc 19; the other arm 33 of the lever is adapted to be actuated downwardly in the direction of the arrow, by any conventional hand or foot-operated mechanism, not herein shown. It is thus apparent that upon a downward depression of arm 33, the lever will be actuated in a clockwise direction, to cause a disengagement of brake 32, a slideable movement of shaft 20 against the action of spring 28, to effect an operative engagement of the two complementary clutch members 16 and 19. When this occurs, the pulley member 18 is caused to rotate and thereby actuate the device being driven thereby, such as a sewing machine, through the medium of suitable belting on the pulley.

The said bearing portion 21 is a constituent part of a spider member 34 containing a plurality of radial arms 35 each provided at the terminal thereof with a socket 36 consisting of a concave semi-cylindrical portion extending transversely of the arm. In rotatable and slidable engagement with each of said sockets is a semi-cylindrical terminal portion 37 constituting the male member of the adjustable joint of which the socket 36 is the female portion. Each of said male members 37 constitutes the outer terminal portion of a supporting arm 38 which extends in the general direction of the motor shaft.

In the preferred arrangement, the opposite terminals of each of said arms 38 are bent substantially at right angles to the longitudinal extent of the arm, both of said terminal portions containing apertures therein also extending substantially in the direction of the motor shaft. At the outer or clutch terminal 39 of the arm 38, the aperture 40 is adapted to accommodate the shank of the bolt 41; and in substantial registry with said aperture, but preferably of slightly greater proportions, is the aperture 42 of socket 36 or the female portion of the joint. The said aperture 42 is preferably in the form of an elongated slot extending in the general direction of the axis of the cylindrical portion of socket 36.

The motor terminal 43 of arm 38 contains an aperture 44, preferably slightly greater than the shank of the stud 45 of the motor 10. The proportions of the apertures 40 and 44 are predetermined so as to permit a maximum radial movement of arm 38 between the extreme positions shown in full and dot-dash lines in Figure 3. In sewing machine installations, where this invention has wide application, the maximum variation between the small and large motors generally employed, ranging from $\frac{1}{6}$ to $\frac{1}{3}$ horsepower, involves a maximum radial difference of $\frac{1}{2}$ inch. It can thus be seen that for such variations the apertures 40 and 44 need not be excessively great.

It is apparent from the description hereinabove given that the mounting constituting my invention is adapted to be supported from the studs or bolts 45 on the motor 10. Most conventional motors contain multi-sectioned housings, the various sections being held together by bolts or studs 45. According to my invention, these securing members 45 are accordingly given an additional function—to support the entire transmission mounting. Inasmuch as the clutch mechanism supported by this mounting must be in substantial axial alignment with the motor, it is obvious that if the motor housing constitutes the supporting means for the mounting, a cooperative relationship between the motor and the clutch can be effected more readily than if the mounting were supported by an independent structure. It is also apparent that the arrangement of my invention eliminates the necessity of providing a special support for the mounting, and obviates the mutilation of any existing structures to enable them to serve as means to support the mounting and associated parts. Furthermore, the entire mounting and motor constitutes a unitary structure, so that when the motor with its bracket 11 is detached from its supporting structure, such as the platform or base 13, the entire motor-transmission assembly is at the same time completely detached and free to be moved as a unit.

In attaching the mounting to a selected motor 10, the nuts 46 on bolts 41 are loosened, so as to permit a relative movement between the male and female portions of the adjustable junctures of the radial arms 35 and terminal portions 39 of supporting arms 38. The nuts 47 are removed from studs 45, and the terminal portions 43 of supporting arms 38 are mounted over said studs 45. The nuts 47 are then replaced and tightened against terminals 43. At the same time the supporting arms 38 are manipulated so as to properly position the male portion 37 within the socket 36. If necessary, the bolts 41 and nuts 46 are first removed to enable such adjustment to be readily made. After the adjustment is made, and each of the bolts 41 is properly in place, the nuts 46 are tightened. In this position, the pulley member 18 and associated parts are firmly supported by the mounting of my invention, which in turn is supported by the motor 10. The adjustment has enabled the parts to be placed in their proper respective relative positions, so that the shafts 20 and 14 are in substantial axial alignment, or in such relationship as to permit the complementary clutch elements 16 and 19 to be in coactive relation.

It will be observed that the adjustment that could be effected at the outer or clutch end of each of the supporting arms 38 is practically universal in nature, so that there could be a pivotal movement of the arm 38 radially with respect to the motor, or a lateral movement thereof transversely with respect to the radial arm 35. This will enable the same mounting to be adjusted to motors of different sizes and proportions, inasmuch as the arms 38 could be adjustably moved for cooperative engagement with differently positioned studs 45. It will be also noted that the arrangement, in the preferred form illustrated, of two supporting arms 38 above the motor shaft, and two therebelow, provides for a firm and stable structural arrangement.

It is of course understood that the embodiment above described and shown in the drawing is merely illustrative of my invention, and that numerous changes and modifications may be made therein within the scope of the appended claims without departing from the spirit of this invention.

What I claim is:

1. In a motor-transmission assembly, an electric motor containing a multi-sectioned housing and a plurality of stud members holding said housing together, said stud members extending substantially parallel to the shaft thereof, a clutch assembly containing a driving plate and a pulley member operatively engageable therewith, a mounting comprising a bearing portion, a plurality of supporting arms extending in the general direction of the motor shaft and attached to the said stud members and adjustable connecting means between the bearing portion and said arms; and actuating means for bringing the plate and pulley member into engagement, said clutch assembly and actuating means being cooperably supported by the motor and the said bearing portion of the mounting.

2. In a motor-transmission assembly, an electric motor containing a multi-sectioned housing and a plurality of stud members holding said housing together, a clutch assembly containing a driving plate and a pulley member operatively engageable therewith, a mounting comprising a spider and a plurality of supporting arms connecting the said spider to said stud members, said spider comprising a bearing portion in substantial axial alignment with the motor shaft and a plurality of radial arms extending outwardly from said bearing portion, detachable fastening means removably holding said supporting arms to said stud members and said radial arms, and actuating means for bringing the plate and pulley member into engagement, said clutch assembly and actuating means being cooperably supported by the motor and the said bearing portion of the spider.

3. In combination with an electric motor having a housing and a plurality of stud securing members thereon, a clutch assembly containing a driving plate affixed to the shaft of the motor, a slide shaft and a pulley member rotatably mounted on the slide shaft; actuating means engageable with the slide shaft for bringing the pulley member into operative engagement with the plate, and a mounting operatively supporting said slide shaft and pulley member, said mounting comprising a spider and a plurality of supporting arms connecting the spider to the stud members on the said motor, the spider containing a bearing portion slidably supporting the slide shaft and a plurality of radial arms extending outwardly from said bearing portion, the said supporting arms being pivotally attached to the said radial arms at the outer extremities thereof, and releasable fastening means to hold said supporting arms in fixed relation to said radial arms.

4. In combination with an electric motor having a housing and a plurality of stud securing members thereon, a clutch assembly containing a driving plate affixed to the shaft of the motor, a slide shaft and a pulley member rotatably mounted on the slide shaft; actuating means engageable with the slide shaft for bringing the pulley member into operative engagement with the plate, and a mounting operatively supporting said slide shaft and pulley member, said mounting comprising a spider and a plurality of supporting arms connecting the spider to the stud members on the said motor, the spider containing a bearing portion slidably supporting the slide shaft and a plurality of radial arms extending outwardly from said bearing portion, the said supporting arms having their inner ends in detachable engagement with the stud members on the motor, the outer ends of the supporting arms being pivotally and slidably joined to the outer extremities of the said radial arms, and releasable fastening means to hold said supporting arms in fixed relation to said radial arms.

5. In combination with an electric motor having a housing and a plurality of stud securing members thereon, a clutch assembly containing a driving plate affixed to the shaft of the motor, a slide shaft and a pulley member rotatably mounted on the slide shaft; actuating means engageable with the slide shaft for bringing the pulley member into operative engagement with the plate, and a mounting operatively supporting said slide shaft and pulley member, said mounting comprising a spider and a plurality of supporting arms connecting the spider to the stud members on the said motor, the spider containing a bearing portion slidably supporting the slide shaft and a plurality of radial arms extending outwardly from said bearing portion, the said supporting arms having their inner ends in detachable engagement with the stud members on the motor, the outer adjacent ends of said supporting and radial arms being adjustably joined together, the said adjacent outer ends being provided with complementary portions of universal joints to permit pivotal and lateral adjusting movement of said supporting arms, and releasable fastening means to hold said supporting and radial arms in fixed relation to each other.

6. In combination with an electric motor having a housing and a plurality of stud securing members thereon, a clutch assembly containing a driving plate affixed to the shaft of the motor, a slide shaft and a pulley member rotatably mounted on the slide shaft; actuating means engageable with the slide shaft for bringing the pulley member into operative engagement with the plate, and a mounting operatively supporting said slide shaft and pulley member, said mounting comprising a spider and a plurality of supporting arms connecting the spider to the stud members on the said motor, the spider containing a bearing portion slidably supporting the slide shaft and a plurality of radial arms extending outwardly from said bearing portion, the outer terminals of said radial arms containing female semi-cylindrical socket members, the said supporting arms having their inner ends in detached engagement with the stud members on the motor and having their outer ends provided with male members in rotatable and slidable engagement with the adjacent said socket members, and releasable fastening means to hold said supporting and radial arms in fixed relation to each other.

7. In combination with an electric motor having a housing and a plurality of stud securing members thereon, a clutch assembly containing a driving plate affixed to the shaft of the motor, a slide shaft and a pulley member rotatably mounted on the slide shaft; actuating means engageable with the slide shaft for bringing the pulley member into operative engagement with the plate, and a mounting operatively supporting said slide shaft and pulley member, said mounting comprising a spider and a plurality of supporting arms connecting the spider to the stud members on the said motor, the spider containing a bearing portion slidably supporting the slide shaft and a plurality of radial arms extending outwardly from said bearing portion, the said supporting arms being pivotally attached to the said radial arms at the outer extremities thereof, said supporting arms having recessed portions in the region of the pulley member to provide an unobstructed path for a pulley belt, and releasable fastening means to hold said supporting arms in fixed relation to said radial arms.

SAMUEL M. FRIEDMAN.